United States Patent [19]
Ahn

[11] Patent Number: 5,864,109
[45] Date of Patent: Jan. 26, 1999

[54] TERMINAL CONNECTION LOCKING APPARATUS FOR VACUUM CIRCUIT BREAKER

[75] Inventor: Hee Il Ahn, Choongcheongbuk-Do, Rep. of Korea

[73] Assignee: LG Industrial Systems Co., Ltd., Seoul, Rep. of Korea

[21] Appl. No.: 15,961

[22] Filed: Jan. 30, 1998

[51] Int. Cl.⁶ .................................................. H01H 33/66
[52] U.S. Cl. ........................... 218/140; 218/120; 218/136
[58] Field of Search ..................................... 218/116, 117, 218/118, 120, 123, 124, 134, 136, 139, 140, 146, 154, 155

[56] References Cited

U.S. PATENT DOCUMENTS

| | | | |
|---|---|---|---|
| 3,898,407 | 8/1975 | Hodgson | 218/140 |
| 4,996,397 | 2/1991 | Kuhn et al. | 218/120 |
| 5,523,536 | 6/1996 | Binder et al. | 218/120 |

Primary Examiner—Lincoln Donovan

[57] ABSTRACT

A terminal connection locking apparatus for a vacuum circuit breaker a trapping latch movably engaged to a driving cam, a crossbar connected to a lower portion of the trapping latch, change levers connected to a central lower surface portion and each side lower surface portion of the crossbar, springs elastically connected to the side change levers, a control lever disposed to a side portion of the contact control screw and externally exposed from the vacuum circuit breaker, a restoring link extended inwardly from the control lever, an interlock lever downwardly connected to an inner end portion of the restoring link, a spring elastically connected to the interlock lever, an engagement link connected to a side portion of control lever and horizontally spaced from the central change lever coupled to the crossbar, and a shielding plate for being rotatably connected to an end portion of the engagement link and covering/discovering the contact control screw. The apparatus facilitates a terminal connection locking operation and obtains an safety with regard to the operation for preventing the disconnection of the circuit breaker.

1 Claim, 7 Drawing Sheets

TERMINAL CONNECTION LOCKING APPARATUS FOR VACUUM CIRCUIT BREAKER

BACKGROUND OF THE INVENTION

1. Field of the Invention

The present invention relates to a vacuum circuit breaker, and more particularly to an improved terminal connection locking apparatus for a vacuum circuit breaker capable of facilitating a terminal connection locking operation and obtaining a safety with regard to the manipulation for preventing a terminal disconnection of the circuit breaker when it is in a conductive state.

2. Description of the Background Art

In general, a vacuum circuit breaker incorporates an apparatus for connecting or disconnecting a power source to an electrical load in a high voltage distributing power line through which there flows a high voltage current in thousands of volts and hundreds of amperes. In order to effectively shield an arc which occurs during a switching operation, the vacuum circuit breaker is provided with a vacuum chamber having a switching mechanism therein.

As shown in FIGS. 1 and 2, the general vacuum circuit breaker is generally composed of switching mechanism 10, switching actuator 20 for actuating the switching mechanism 10, and an auxiliary device (not shown).

With reference to FIGS. 3 and 4, the switching mechanism 10, the switching actuator 20 and the auxiliary device (not shown) will be described in further detail.

The switching mechanism 10 is directed to connect or disconnect an electrical connection of the power source and electrical load and disposed in the vacuum chamber 11.

A movable contactor (not shown) of the switching mechanism 10 is operable in connection with the switching actuator 20 of the vacuum circuit breaker, and when the vacuum circuit breaker is in a turn-on state, the movable contactor (not shown) remains in contact with a fixed contactor (not shown) of the switching mechanism 10.

Also, when the circuit breaker is in a turn-off state, the movable contactor (not shown) is separated from the fixed contactor by an appropriate breaking distance at an appropriate speed.

The switching actuator 20 which denotes an entire operational apparatus provided in a front part of the switching actuator 20 serves as an mechanical mechanism for carrying out a turn-on/off contact operation of the switching mechanism 10.

The auxiliary device for allowing the circuit breaker to become in normal operation, includes: a control apparatus (not shown) provided together with the switching actuator 20, receiving an externally generated electrical signal and controlling the on/off operation of the circuit breaker; a terminal connection device for enabling a moving on/off operation of the circuit breaker; and an interlock device for protecting the terminal connection device.

The thusly constituted conventional terminal connection locking apparatus will now be explained.

As shown in FIG. 5, the switching mechanism 10 moves from driving position to test position in a moving-off operation, and from test position to driving position in a moving-on operation.

The test position denotes a location wherein it is possible to turn on/off the vacuum circuit breaker in a case in which the input and output terminals 12a, 12b are separated from power source and load terminals 13a, 13b, that is, when current does not flow in the circuit breaker. The driving position indicates a location wherein the current does flow when the circuit breaker is turned on and the current does not flow when the circuit breaker is turned off in a case in which the input and output terminals 12a, 12b are in contact with the power source and load terminals 13a, 13b.

As further shown in FIGS. 3 and 4, a cam shaft 30 is disposed in the switching actuator 20 and a stopper 31 is engaged to an end portion of the cam shaft 30.

A lower end portion of a support rod 33 is fixed to a base plate 40 of the switching actuator 20, and a higher end portion of the support rod 33 is extended outside the vacuum circuit breaker to form a handle 32.

The handle 32 of the support rod 33 is covered with a handle cover 34.

Also, to a lower side portion of the support rod 33 there is coupled an L-type hook 35. A shielding plate 37 engaged to a fixed plate 36 is connected to another lower side portion of the support rod 33.

The shielding plate 37 is provided to move up and down by manipulating the handle 32 to open or close a contact control screw 38.

The stopper 31 rotates forwardly or backwardly in accordance with a turn-on/off operation of the circuit breaker, and the stopper 31 is mounted on or deviated from an upper portion of the L-type hook 35, thereby controlling an upward movement of the L-type hook 35.

Reference numeral 50 denotes wheels for moving the circuit breaker.

The operation of the thusly constituted conventional terminal connection locking apparatus for a vacuum circuit breaker will now be described.

Initially, the control apparatus (not shown) allows the circuit breaker to be turned on and the cam shaft 30 to rotate in an anti-clockwise direction in accordance with an electrical signal, and accordingly the stopper 31 engaged to the cam shaft 30 rotates in an anti-clockwise direction in order for the stopper to be in contact with the upper portion of the L-type hook 35.

Here, when the handle 32 is upwardly pulled, the L-type hook 35 engaged to the support rod 33 is hooked on the stopper 31, whereby the support rod 33 is not allowed to further move to an upward direction.

Subsequently, the shielding plate 37 connected to the support rod 33 is also not allowed to upwardly move, and the contact control screw 38 becomes inoperable, thereby preventing the terminal separation of the circuit breaker.

Meanwhile, when the circuit breaker is turned off by the control apparatus, the cam shaft 30 is rotated in a clockwise direction, and also the stopper 31 engaged to the cam shaft 30 is also rotated in the clockwise direction, whereby the stopper 31 is deviated from the upper portion of the L-type hook 35. Here, when the handle 32 is upwardly pulled, the L-type hook 35 connected to the support rod 33 is not hooked on the stopper 31, whereby the support rod 33 becomes upwardly movable.

Accordingly, the shielding plate 37 connected to the support rod 33 is also moved to an upward direction, thereby exposing the contact control screw 38.

Then, the exposed contact control screw 38 guides the circuit breaker to move off by use of a control handle (not shown) which is to be inserted into the contact control screw 38.

However, when the circuit breaker remains in a turn-on state, the control handle (not shown) is placed on the contact control screw 38 of the circuit breaker. Also, when the circuit breaker is located in the driving position, if the circuit breaker remains turned on, an electrical shock may incurred to the manipulator.

Therefore, there is strongly required a terminal connection locking apparatus which does not allow the control handle (not shown) to be covered onto the contact control screw 38 when the circuit breaker remains turned on.

However, the conventional terminal connection locking apparatus for a vacuum circuit breaker according to the present invention is provided with a spaced distance between the handle and the contact control screw, thereby generating difficulties in working, manipulation, and safe operation.

SUMMARY OF THE INVENTION

Accordingly, it is an object of the present invention to provide a terminal connection locking apparatus for a vacuum circuit breaker, which facilitates a terminal connection locking operation and obtains a safety with regard to the operation for preventing the terminal separation of the circuit breaker when it is in a turned-on state.

To achieve the above-described object, there is provided a terminal connection locking apparatus for a vacuum circuit breaker provided with a switching mechanism, a switching actuator having a driving cam for actuating the switching of the switching mechanism, input/output terminals, and a contact control screw for moving the input/output terminals towards power source and electrical load terminals, which includes a trapping latch movably engaged to the driving cam disposed in the switching actuator, a crossbar connected to a lower portion of the trapping latch, a plurality of change levers, respective one end portions thereof being connected to a central lower surface portion and each side lower surface portion of the crossbar, and respective other end portions thereof being connected to the switching mechanism, a plurality of springs elastically connected to the side change levers, a control lever disposed to a side portion of the contact control screw and externally exposed from the vacuum circuit breaker, a restoring link extended inwardly from the control lever and disposed inside the vacuum circuit breaker, an interlock lever downwardly connected to an inner end portion of the restoring link, a spring elastically connected to the interlock lever, an engagement link connected to a side portion of control lever, disposed inside the vacuum circuit breaker, horizontally spaced by a predetermined interval from the central change lever coupled to the crossbar, and a shielding plate for being rotatably connected to an end portion of the engagement link and covering/discovering the contact control screw.

The object and advantages of the present invention will become more readily apparent from the detailed description given hereinafter. However, it should be understood that the detailed description and specific example, while indicating a preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

With reference to the accompanying drawings, the terminal connection locking apparatus for a vacuum circuit breaker according to the present invention will now be described.

Figure 1:
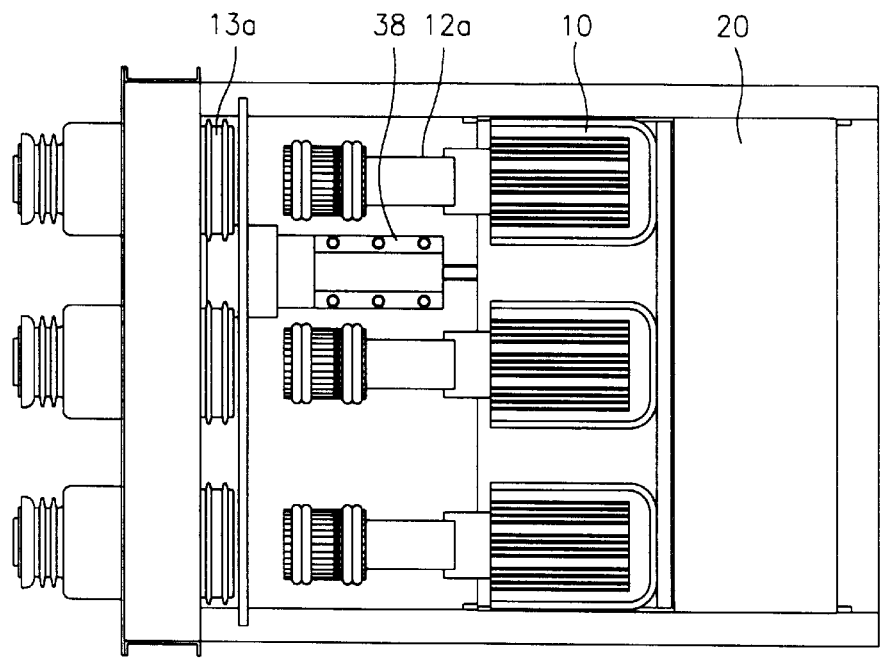
FIG. 1 is plan view illustrating a general vacuum circuit breaker.
Figure 2:
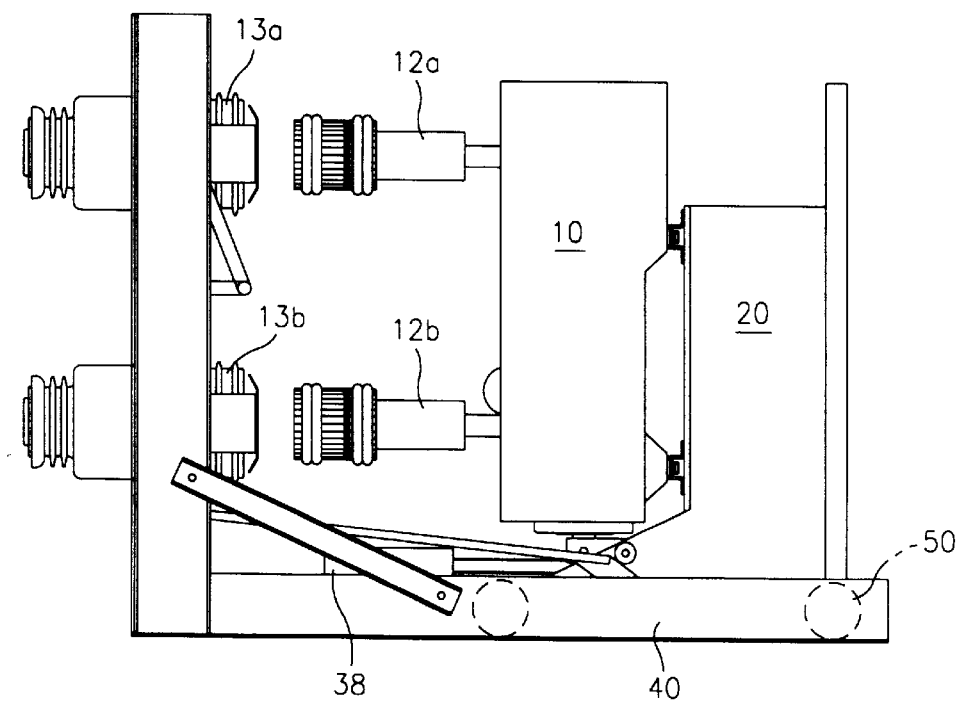
FIG. 2 is a side view illustrating a general vacuum circuit breaker.
Figure 3:
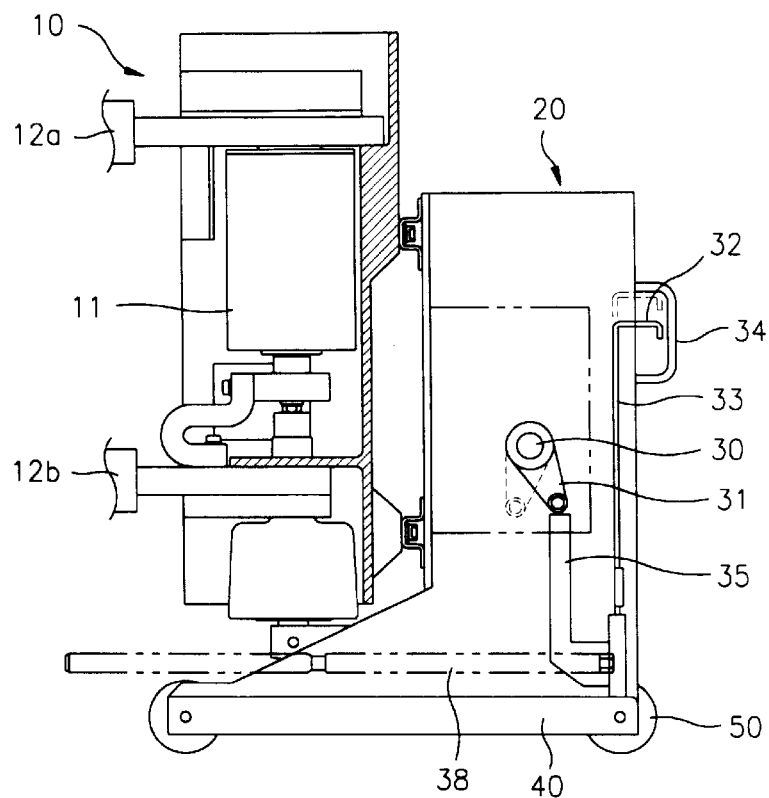
FIG. 3 is a side view illustrating a vacuum circuit breaker including a terminal connection locking apparatus according to a conventional art.
Figure 4:
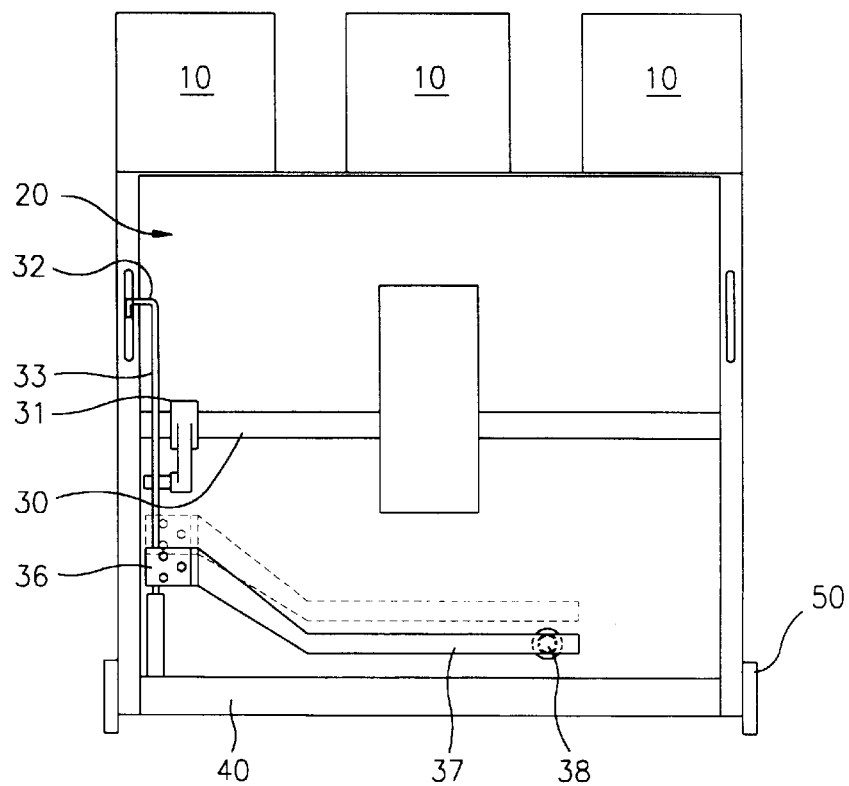
FIG. 4 is a front view illustrating a vacuum circuit breaker including a terminal connection locking apparatus according to the conventional art.
Figure 5:
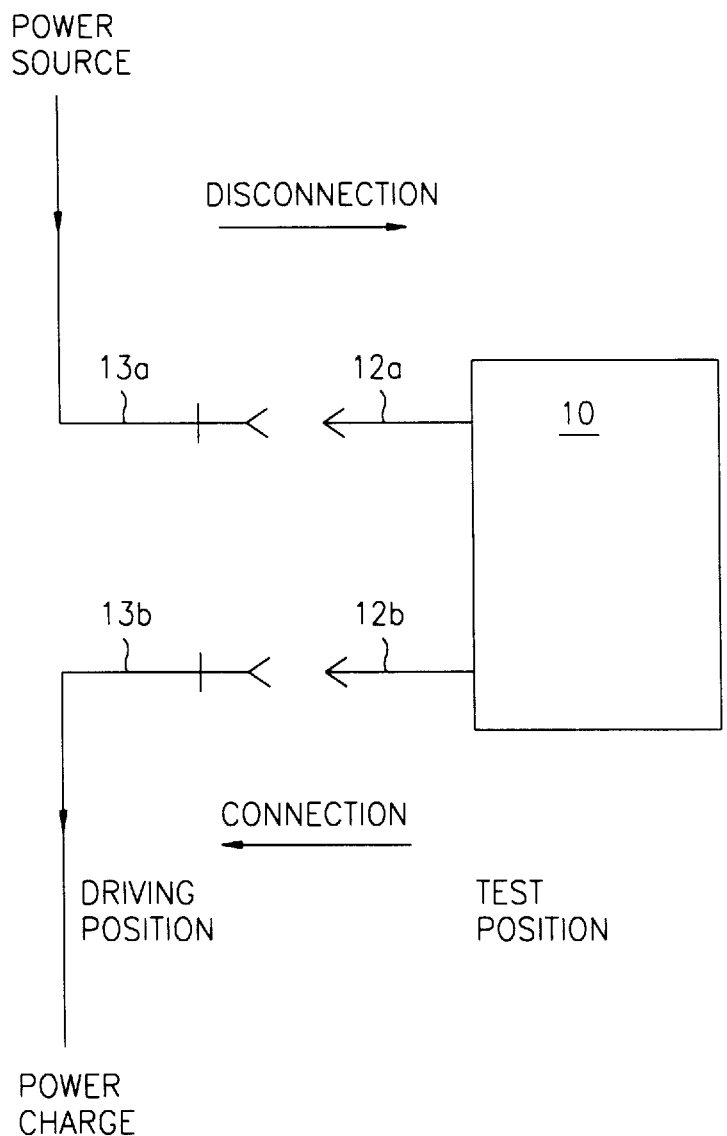
FIG. 5 is a schematic diagram illustrating a driving position and a test position with regard to the circuit breaker.
Figure 6:
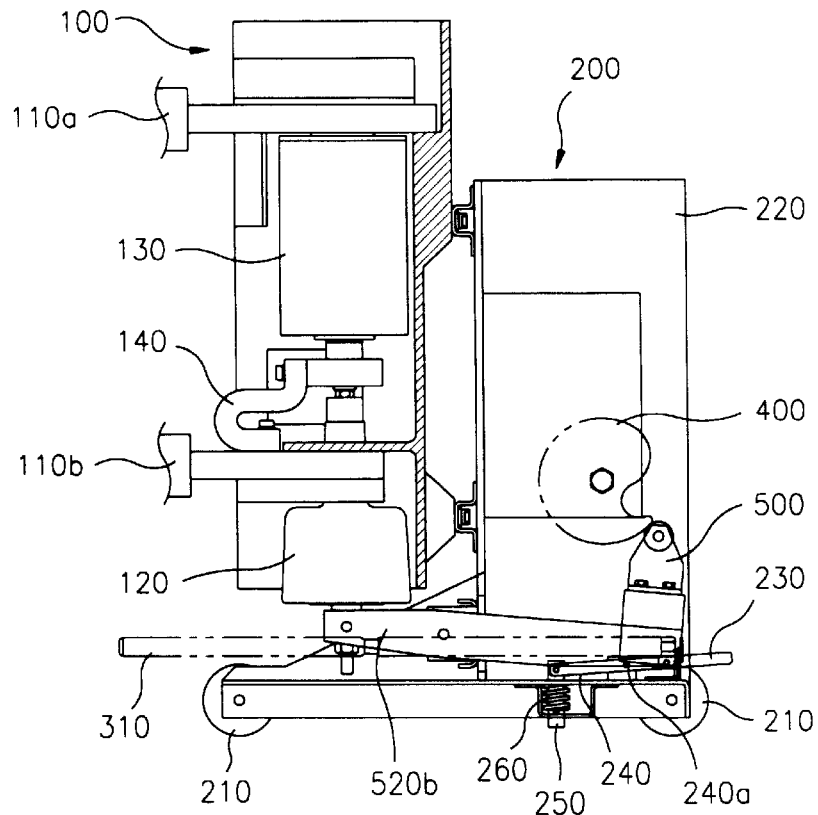
FIG. 6 is a side view illustrating a vacuum circuit breaker according to the present invention.
Figure 7:
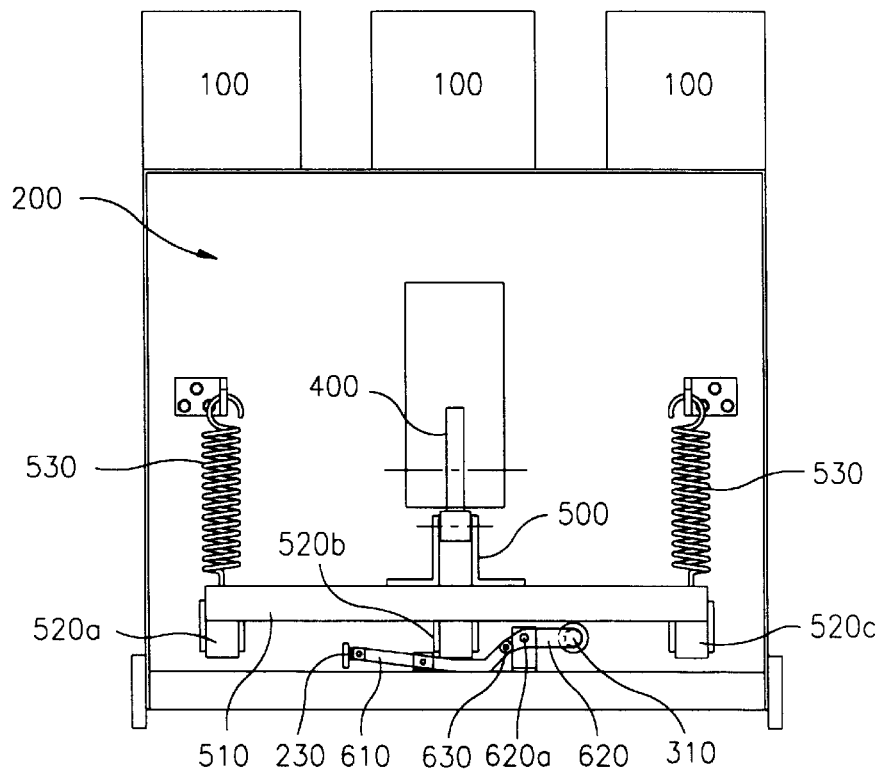
FIG. 7 is a front view illustrating the vacuum circuit breaker according to the present invention.

As shown in FIGS. 6 and 7, a vacuum circuit breaker having the terminal connection locking apparatus for according to the present invention includes a switching mechanism 100, a switching actuator 200 for actuating the switching mechanism 100 and an auxiliary device (not shown). Here, the switching mechanism 100 and the switching actuator 200 are identical to those of the conventional art in composition and function, so their description will be omitted, accordingly. Also, the auxiliary device (not shown) except for a terminal locking device 300 is identical to that of the conventional art and its description will be omitted as well.

Therein, reference numeral 110a is a power source terminal, and reference numeral 110b is a power load terminal.

Figure 8:
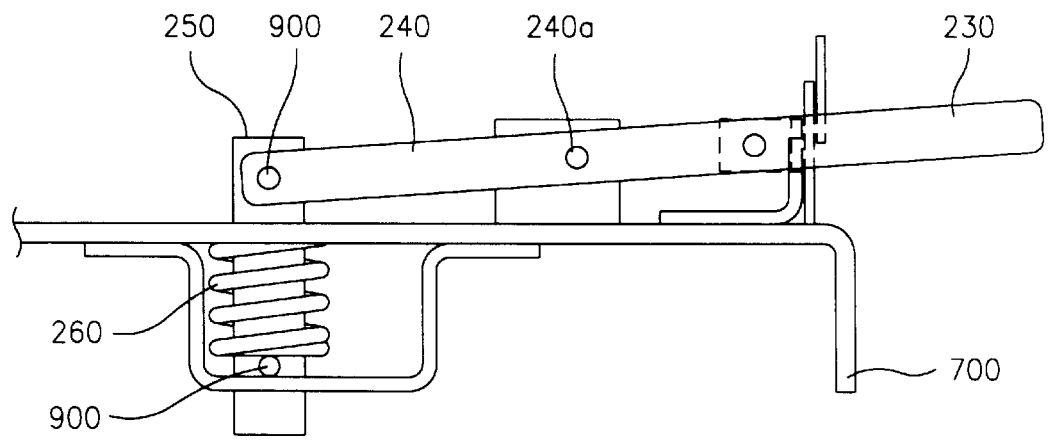
FIG. 8 is a side view detailing the terminal connection locking apparatus for a vacuum circuit-breaker according to the present invention.
Figure 9:
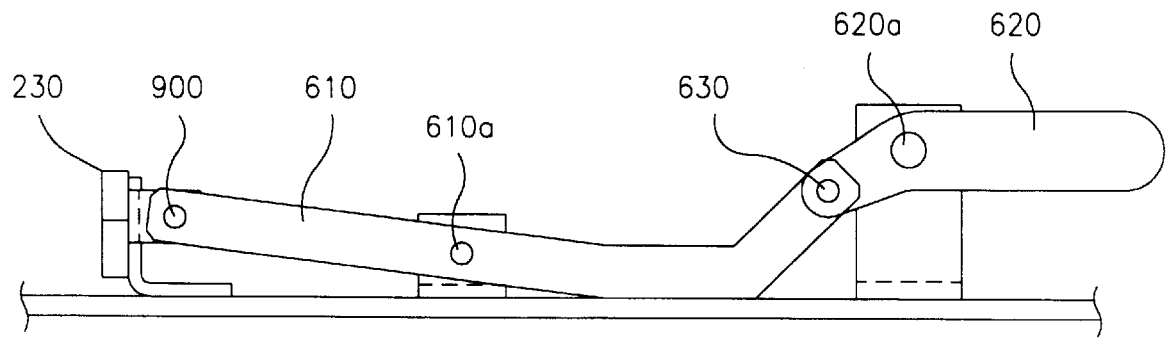
FIG. 9 is a front view detailing the terminal connection locking apparatus for a vacuum circuit breaker according to the present invention.

As shown in FIGS. 8 and 9, the terminal locking device 300 includes a control lever 230 extended from the front cover 220 of the switching actuator 200, and a restoring link 240 extended inwardly from the control lever 230 and rotatable on the axis of the rotation shaft 240a.

An interlock lever 250 is movably engaged by a fixture pin 900 to an inner end portion of the restoring link 240 so as to move up and down in correspondence to the restoring link 240.

A spring 260 serves to elastically support the interlock lever 250 to have a restoration force.

A trapping latch 500 which is operable in correspondence to the rotation of a driving cam 400 disposed in the switching actuator 200 is mounted on a central portion of a cross bar 510 horizontally disposed in a lower portion of the switching actuator 200. Also, three change levers 520a, 520b, 520c are correspondingly connected to a central lower surface portion and each side lower surface portion of the crossbar 510.

Respective inner end portions of the change levers 520a, 520b, 520c connected to the crossbar 510 are respectively engaged to a corresponding one of insulation push rods 120, thereby transferring an turn-on/off operation of the vacuum circuit breaker.

A spring 530 is vertically connected to each of the change levers 520a, 520c engaged to each end portion of the crossbar 510, thereby elastically supporting the trapping latch 500.

Meanwhile, to a side portion of the control lever 230 there is provided an engagement link 610 spaced by a predetermined interval from below the central change lever 520b, thereby transferring an up and down reciprocal movement of the control lever 230 via a rotation shaft 610a.

To a side end portion of the engagement link 610 there is rotatably connected a shielding plate 620 for exposing a contact control screw 310 therebehind. The shielding plate 620 is hingedly connected by a shielding shaft 620a to the side end portion of the engagement link 610.

Therein, reference numeral 130 is a vacuum chamber, reference numeral 140 is a moving terminal connected to a side portion of the load terminal 110b to be movably engaged to the insulation push rod 120 which reciprocates up and down, and reference numerals 700 and 900 are a lower plate and a fixture pin.

The thusly constituted terminal connection locking apparatus for a vacuum circuit breaker according to the present invention will now be described with reference to the accompanying drawings.

Figure 10:
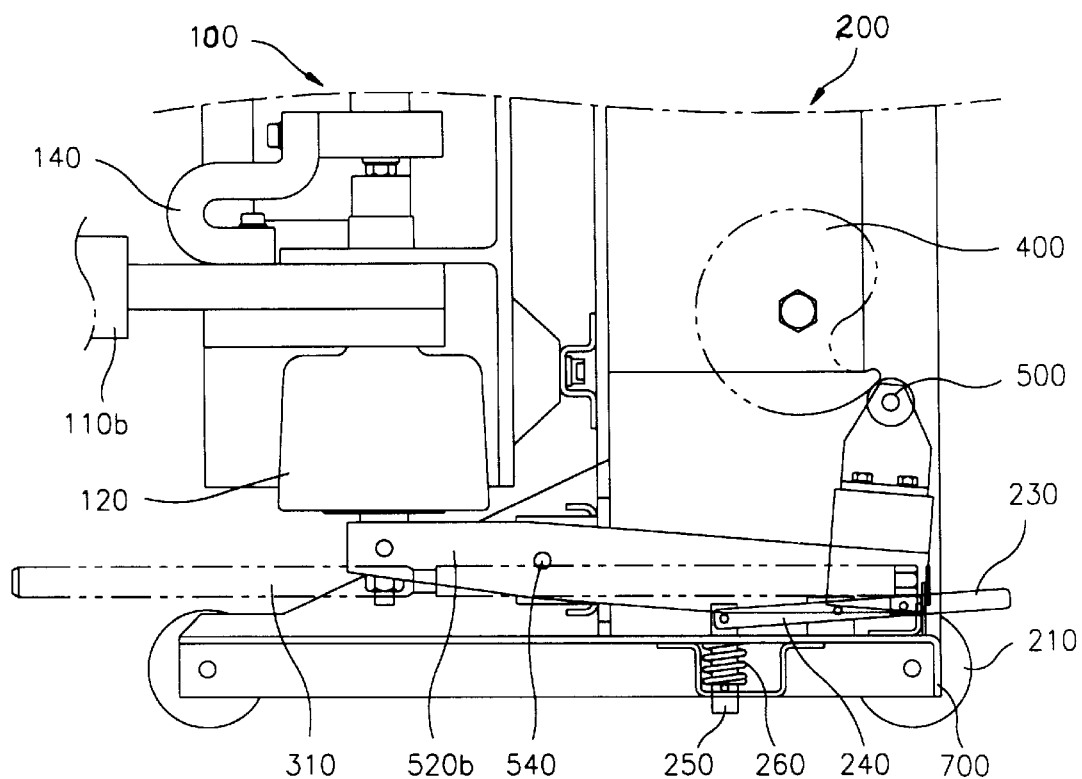
FIG. 10 is a side view illustrating a locked state of the terminal connection locking apparatus for a vacuum circuit breaker according to the present invention.
Figure 11:
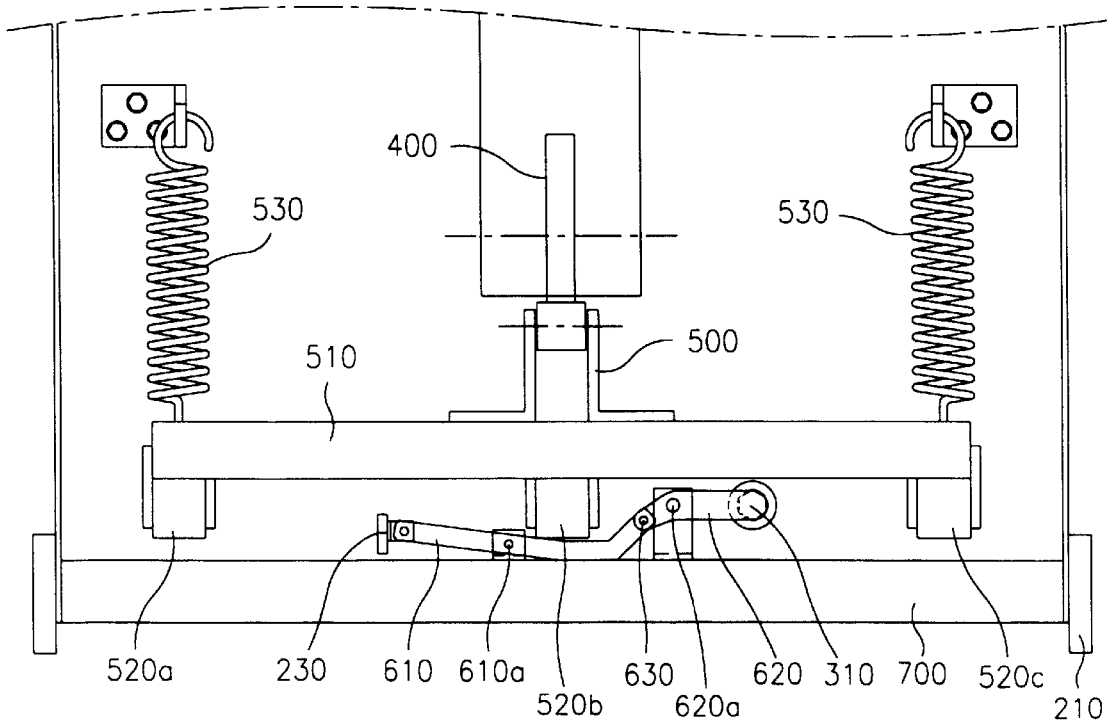
FIG. 11 is a front view illustrating a locked state of the terminal connection locking apparatus for a vacuum circuit breaker according to the present invention.

First, as shown in FIGS. 10 and 11 illustrating a turned-on state of the vacuum circuit breaker according to the present invention, when the driving cam 400 in the switching actuator 200 rotates, the trapping latch 500 is downwardly pressed in accordance with the rotation, and accordingly the crossbar 510 connected to the trapping latch 500 is also pressed downwardly.

Also, the central changer lever 520b connected to the central portion of the crossbar 510 becomes operable with the central shaft 540 as an operational axis thereof.

The insulation push rod 120 in the switching mechanism 100 connected to the end portion of the central change lever 520b is moved upwardly so that a movable contactor (not shown) in the vacuum chamber 130 becomes in contact with the fixed contactor (not shown), whereby the vacuum circuit breaker remains turned on.

Subsequently, when the control lever 230 is pressed down by an operator, although the engagement link 610 connected to the control lever 230 is affected by the pressing of the control lever 230, the shielding plate 620 that covers in front of the contact control screw 310 remains closed because the engagement link 610 is pressed down by the central change lever 520b, so that the shielding plate 620 covering the contact control screw 310 remains closed, thereby preventing the separation of the terminals 110a, 110b from the terminals 13a, 13b.

Figure 12:
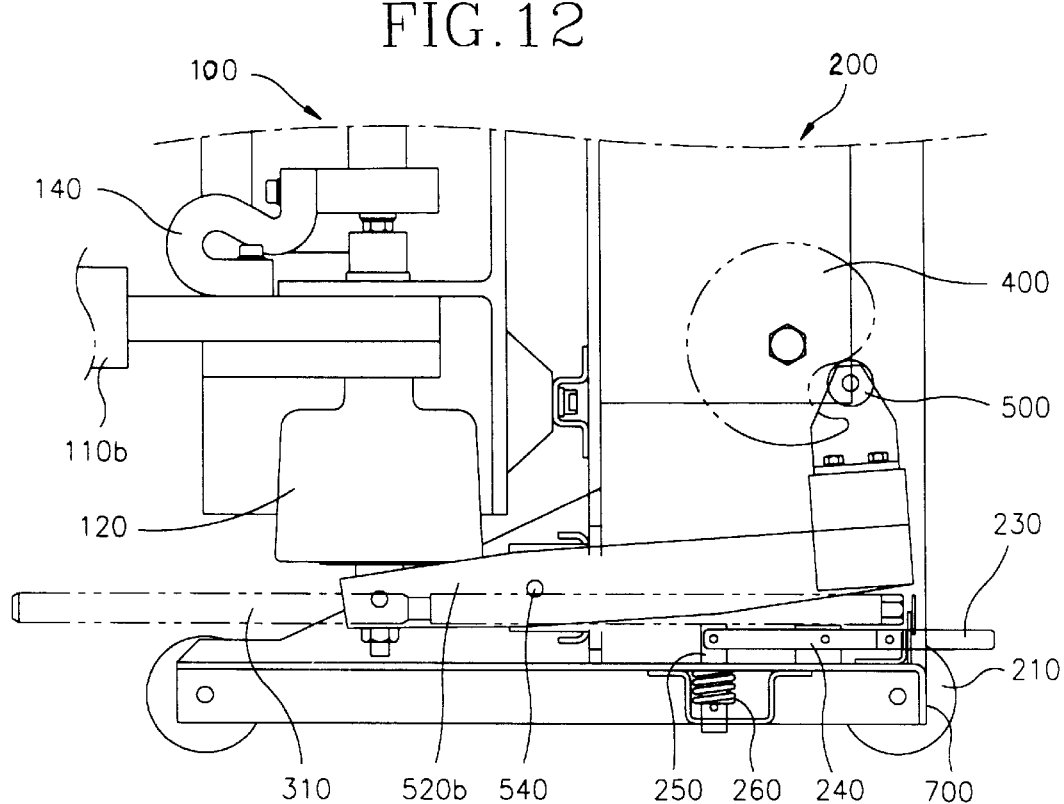
FIG. 12 a side view illustrating a unlocked state of the terminal connection locking apparatus for a vacuum circuit breaker according to the present invention.
Figure 13:
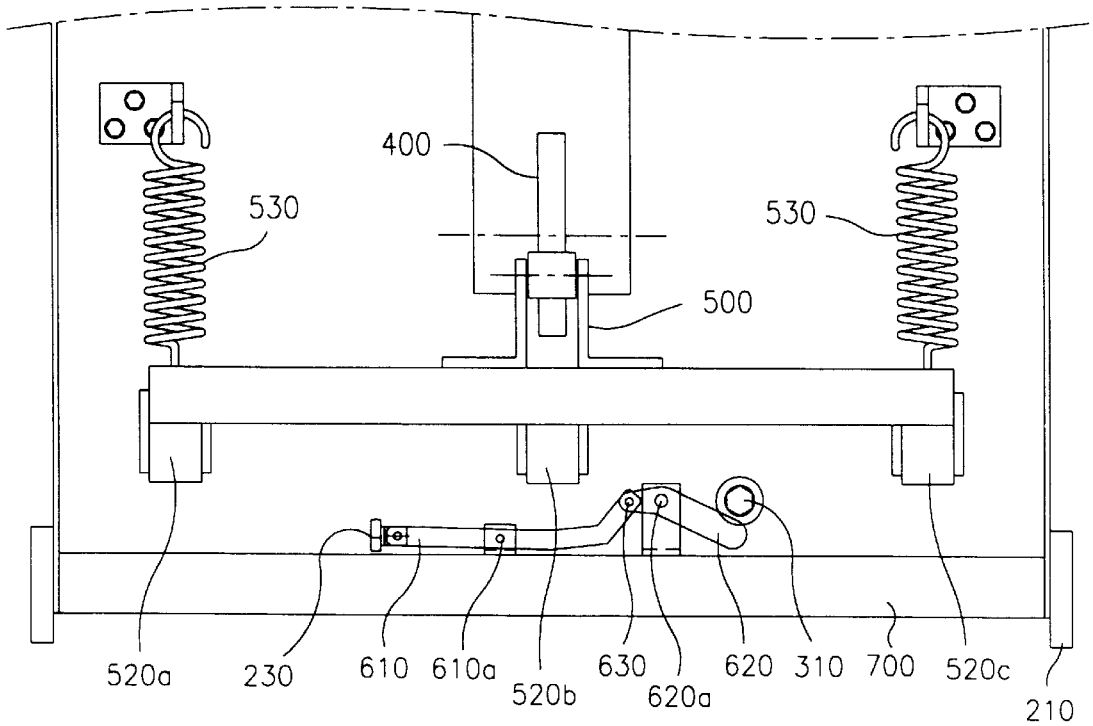
FIG. 13 is a front view illustrating a unlocked state of the terminal connection locking apparatus for a vacuum circuit breaker according to the present invention.

As further shown in FIGS. 12 and 13 illustrating a turned-off state of the vacuum circuit breaker according to the present invention, when the driving cam 400 in the switching actuator 200 rotates, the trapping latch 500 becomes moving in an upward direction by the spring 530 provided at each end portion of the crossbar 510, and the movable contactor (not shown) becomes disconnected by a reverse operation to the separation preventing state described above, whereby the vacuum circuit breaker remains turned off.

Here, when the control lever 230 is pressed by an operator, the engagement link 610 becomes rotating in an anti-clockwise direction with the rotation shaft 540 as an axis thereof, and the shielding plate 620 becomes moving in a downward direction by the shielding hinge 630 with a central shaft 620a serving as a rotational axis thereof.

In accordance with the rotation of the shielding plate 620, the contact control screw 310 is externally exposed to remain in an allowable state of terminal separation.

Meanwhile, the pressing force of the operator is removed from the control lever 210, the interlock lever 250 connected vertically to an end portion of the restoring link 240 extended from the control lever 210 is restored to its initial location by a restoration force of the spring 260, whereby the the shielding plate 620 is also restored to its initial location.

As described above, in the terminal connection locking apparatus for a vacuum circuit breaker, the control lever is disposed to a side portion of the contact control screw serving to connect/disconnect the input and output terminals of the vacuum circuit breaker to facilitate the terminal connection locking/unlocking operation. Further, the terminal connection locking apparatus is provided with the crossbar which operates correspondingly with the turn-on/off operation of the vacuum circuit breaker, thereby providing a safe manipulation for preventing the terminal disconnection of the circuit breaker.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claim, and therefore all changes and modifications that fall within meets and bounds of the claim, or equivalences of such meets and bounds are therefore intended to embrace the appended claim.

What is claimed is:

1. A terminal connection locking apparatus for a vacuum circuit breaker including a switching mechanism, a switching actuator having a driving cam for actuating the switching of the switching mechanism, input/output terminals, and a contact control screw for moving the input/output terminals towards power source and electrical load terminals, comprising:

a trapping latch movably engaged to the driving cam disposed in the switching actuator;

a crossbar connected to a lower portion of the trapping latch;

a plurality of change levers, respective one end portions thereof being connected to a central lower surface portion and each side lower surface portion of the crossbar, and respective other end portions thereof being connected to the switching mechanism;

a plurality of springs elastically connected to the side change levers;

a control lever disposed to a side portion of the contact control screw and externally exposed from the vacuum circuit breaker;

a restoring link extended inwardly from the control lever and disposed inside the vacuum circuit breaker;

an interlock lever downwardly connected to an inner end portion of the restoring link;

a spring elastically connected to the interlock lever;

an engagement link connected to a side portion of control lever, disposed inside the vacuum circuit breaker, horizontally spaced by a predetermined interval from the central change lever coupled to the crossbar; and a shielding plate for being rotatably connected to an end portion of the engagement link and covering/discovering the contact control screw.

* * * * *